United States Patent [19]
Alden et al.

[11] Patent Number: 5,563,614
[45] Date of Patent: Oct. 8, 1996

[54] LOW NOISE DUAL POLARIZATION ELECTROMAGNETIC POWER RECEPTION AND CONVERSION SYSTEM

[75] Inventors: Adrian W. Alden, Ottawa; George W. Jull, Nepean; Tom T. Ohno, Carp, all of Canada

[73] Assignee: Her Majesty in right of Canada, as represented by the Minister of Communications, Ottawa, Canada

[21] Appl. No.: 389,723

[22] Filed: Feb. 15, 1995

Related U.S. Application Data

[63] Continuation of Ser. No. 106,974, Aug. 16, 1993, abandoned, which is a continuation of Ser. No. 623,122, Dec. 6, 1990, abandoned.

[30] Foreign Application Priority Data

Dec. 19, 1989 [CA]  Canada .................................. 2006481

[51] Int. Cl.$^6$ ........................... H01Q 1/28; H01Q 17/00; H01Q 21/24; H01Q 23/00
[52] U.S. Cl. ........................ 343/701; 343/814; 343/815; 343/816; 343/909
[58] Field of Search ........................ 343/700 MS, 705, 343/701, 708, 812, 753, 755, 909, 910, DIG. 2, 853, 814–816, 817, 826; H01Q 1/38, 13/08, 1/28, 15/00, 15/24, 19/00, 19/02, 19/06, 19/10, 15/02, 15/04, 15/06, 15/08, 15/10, 15/12, 15/14, 15/16, 15/18, 15/20, 15/22

[56] References Cited

U.S. PATENT DOCUMENTS

| | | | |
|---|---|---|---|
| 4,079,268 | 3/1978 | Fletcher et al. | 343/700 MS |
| 4,656,487 | 4/1987 | Sureau et al. | 343/909 |
| 4,827,276 | 5/1989 | Fukuzawa et al. | 343/778 |
| 4,878,060 | 10/1989 | Barbier et al. | 343/778 |
| 5,321,414 | 6/1994 | Alden et al. | 343/814 |

OTHER PUBLICATIONS

Yegorov et al., Analysis of The Scattered Field of a Rectenna, Radio Teckhnika No. 4, 1988, pp. 71–73.
Brown W. C. Performance Characteristics of The Thin–Film, Etcheo–Circuit Rectenna 1984 IEEE MTT–S Digest, pp. 365–367.
Schlesak et al., A Microwave Powered High Altitude Platform, 1988 IEEE MTT–S Digest, pp. 283–286.
Finnell, W., Solar Powered Satellite/MWave Power Xmisson and Reception System Energy Coversion Eng. Conf., Atlanta, Aug. 9–14, 1981, pp. 266–271.

Primary Examiner—Peter Toby Brown
Attorney, Agent, or Firm—Pascal & Associates

[57] ABSTRACT

A low noise dual polarization electromagnetic power reception and conversion system is disclosed. It comprises a first plurality of conducting elements performing a bandpass function on incident waves, a second plurality of antenna units, located behind the first elements, performing a power reception and conversion function, and a third plurality of conducting elements located behind the antenna units, performing a bandstop function on incident signals. A layer of lossy material is optionally disposed behind the third elements to absorb any wave passing through them. This system can be used to achieve high efficiency power reception and conversion and also reduce levels of radiation of both harmonics of the powering frequency and intermodulation products formed by nonlinear mixing of signal wavefields from other users of the radio spectrum with the powering signal wavefield.

5 Claims, 3 Drawing Sheets

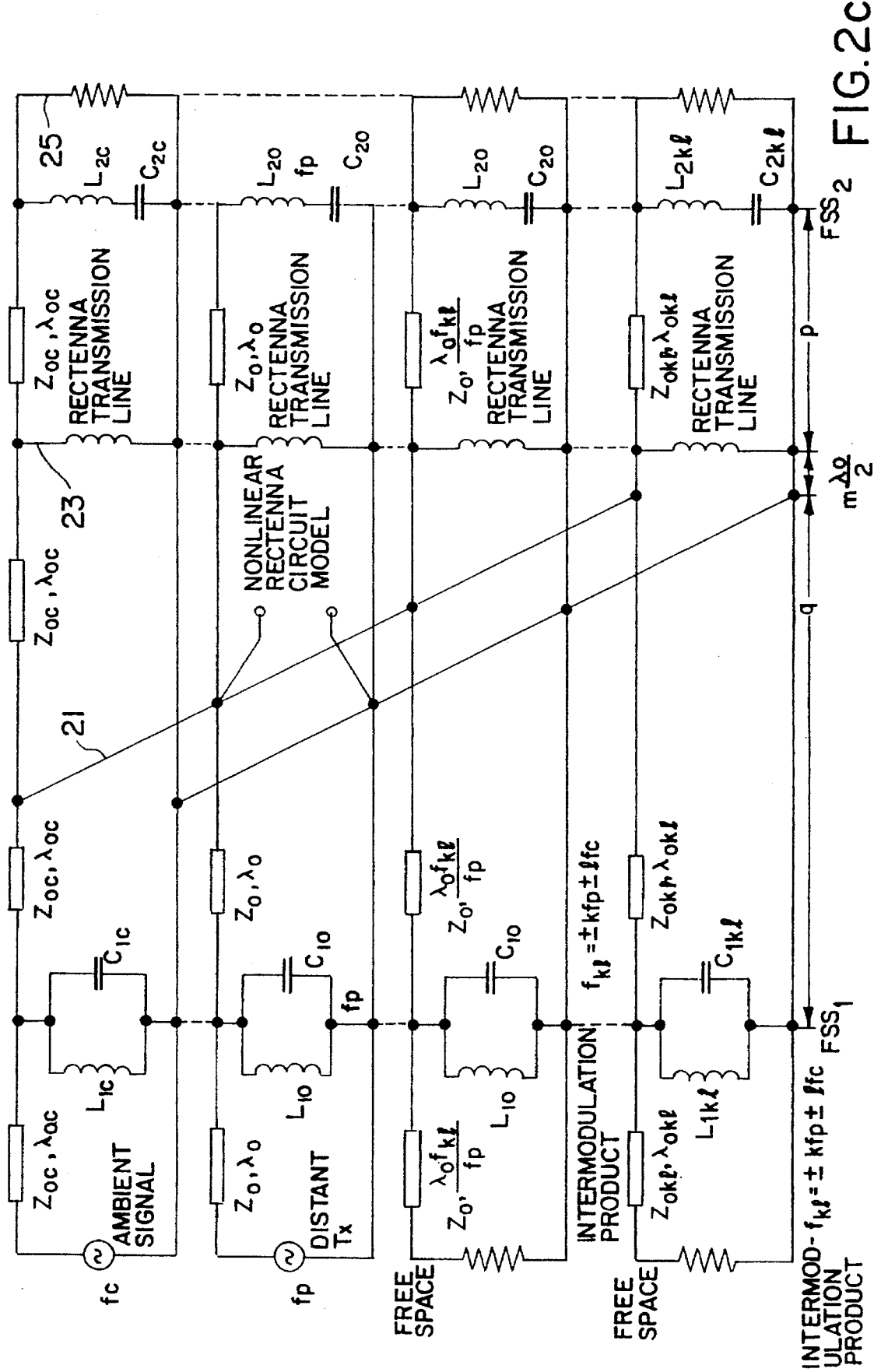

LOW NOISE DUAL POLARIZATION ELECTROMAGNETIC POWER RECEPTION AND CONVERSION SYSTEM

This application is a continuation of Ser. No. 08/106,974, filed 16 Aug. 1993 and now abandoned; which is a continuation of Ser. No. 07/63122, filed 06 Dec. 1990 and now abandoned.

FIELD OF THE INVENTION

The present invention relates to systems for the reception of the power in electromagnetic waves and conversion of this power to direct current power. More specifically, it relates to rectenna (rectifying antenna) arrays which incorporate electromagnetic wave filters and an optional electromagnetic wave absorbing medium to reduce the levels of radiated spurious signals.

BACKGROUND OF THE INVENTION

In recent years there have been many studies on the use of electromagnetic waves for energy transmission between two separated locations. It has been found in these studies that there is a need for a cost-effective means for reception and conversion of electromagnetic power to direct current power which is suitable for environments in which the radiated waves from the reception/conversion system could degrade the performance of other electronic systems within the range of the rectennas. An exemplary application of the reception/conversion system in which this need arises is the provisioning of 30 KW or more of propulsive and communications payload power for lightweight electrically-powered aircraft. In operation, such aircraft would circle over fixed ground antenna systems, transmitting power in the 2.4 to 2.5 GHz microwave Industrial, Scientific and Medical (ISM) band, for continuous periods of weeks or months at a time, relay communications signals between separated locations, or carry out other missions, based on long endurance aircraft platforms. It is, of course, of paramount importance to ensure that radiated emissions from the rectenna subsystem are not such as to degrade the performance of payload and aircraft electronics, or other ground or airborne electronics.

An applicant's copending application, Canadian Serial No. 557,680 filed on 16 Sep. 1988, which corresponds to U.S. patent application Ser. No. 07/124,159, filed Nov. 23, 1987 and now U.S. Pat. No. 4,943,811, describes a dual polarization power reception and conversion system. This system uses a rectenna array configuration which consists of two orthogonally polarized arrays of thin film rectennas with novel format and particular element spacing. This system has been demonstrated to be highly efficient for reception and conversion of the power in a microwave signal wavefield, received over a wide range of incident angles. However, it has a significant drawback which may limit its use in various operating environments, namely its potential for generating electromagnetic interference. Because of the non-linear nature of the power conversion process (from the powering frequency $f_p$ to dc) at each rectenna element, a natural by-product of this conversion is the generation of harmonics $nf_p$ of the powering frequency (where n is an integer). In prior art rectennas, as described in the above-mentioned pending application and in U.S. Pat. No. 3,434,678, the only measure taken to reduce the levels of radiation of this harmonic power is the inclusion of a low-pass filter as a circuit element between each antenna terminal and non-linear conversion device, such as rectifiers, etc. When only this means for harmonic attenuation is employed, significant levels of harmonic radiation, especially at the 2nd, 3rd and 4th harmonics, are produced, as reported in an article entitled "Environmental Assessment for the Satellite Power System Concept Development and Evaluation Program—Electromagnetic Systems Compatibility" by Davis et al, U.S. Dept. of Energy, DOE/ER-0096, January 1981.

In addition, and of major significance with prior art rectennas, is the radiation of 'intermodulation product' signals. In many locations in which rectenna arrays could be used, radio signals from other users of the spectrum, of a wide variety of frequencies $f_{c1}, \ldots f_{cm}$ and strengths, will be incident on the rectenna array along with the powering signal at a frequency $f_p$. Non-linear mixing of all received signals at the rectifying diode will result in the generation of spurious intermodulation signals at combination frequencies $$\pm k f_p \pm \sum_n l_n f_{cn}.$$

Due to the high level of the powering signal, these intermodulation product signals will be radiated at sufficient amplitudes to interfere with the performance of other electronic systems. The only measure taken to reduce this radiation in the prior art rectennas is the previously-mentioned low-pass circuit filtering which, because of the severity of the problem, in many circumstances may be insufficient to reduce the level of intermodulation product signals sufficiently to comply with regulatory standards set for interference levels.

SUMMARY OF THE INVENTION

As will be discussed in detail below, the aforementioned deficiencies of the prior art systems are significantly reduced with the present invention. Briefly stated, a low noise dual polarization electromagnetic power reception and conversion system according to the present invention consists of a plurality of frequency bandpass filter elements arranged symmetrically in an array in a first plane for spatial bandpass filtering an incident electromagnetic powering beam and incident ambient signals. The system further includes a plurality of antenna units, each having a power conversion circuitry, arranged symmetrically in an array in at least one second plane behind the first plane for receiving in dual polarization and converting the powering beam and for non-linearly mixing the ambient signals and the powering beam. A plurality of frequency bandstop elements are arranged symmetrically in an array in a third plane behind the second plane for bandstopping the powering beam and the ambient signals.

OBJECTS OF THE INVENTION

It is an object of the present invention to provide a high efficiency power reception and conversion system with characteristics such as to minimize the levels of spurious signals radiated at harmonics of the powering signal frequency.

It is a further object of the present invention to provide a high efficiency power reception and conversion system with characteristics such as to minimize the levels of radiated spurious intermodulation signals resulting from the nonlinear mixing of the powering and communications signals incident on the rectenna.

It is a further object of the present invention to provide a high efficiency power reception and conversion system capable of operating efficiently over a wide range of angles as may be required to accomodate variations in angular orientation of the rectenna system relative to the direction of the incident electromagnetic powering signal wavefield.

BRIEF DESCRIPTION OF THE DRAWINGS

Other objects, features and advantages of the present invention will be apparent from the following description taken in connection with the accompanying drawings, wherein:

FIG. 2c is a schematic transmission line network model representing the generation and control of intermodulation product frequency radiation for one polarization of the rectenna unit.

DETAILED DESCRIPTION OF PREFERRED EMBODIMENTS OF THE INVENTION

Figure 1:
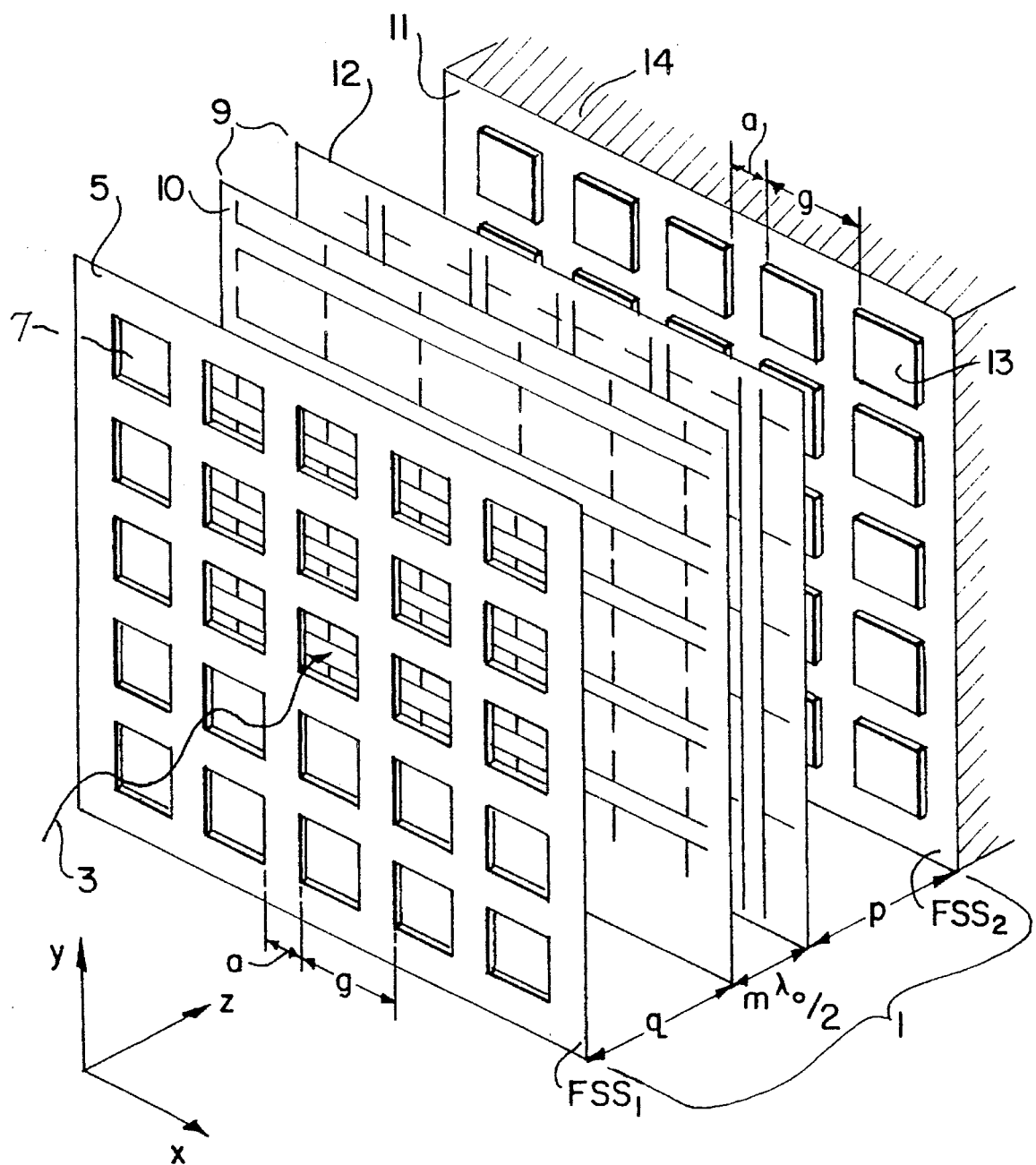
FIG. 1 is a perspective view of the present invention according to one embodiment comprising two surfaces of conducting elements with, in between them, an array of antennas and associated conversion circuits, the ensemble followed by a layer of absorptive material.

FIG. 1 illustrates a low noise power reception and conversion system configured according to one embodiment of the present invention. The power reception and conversion system 1 is positioned to intercept a portion of an electromagnetic power beam 3 transmitted in a direction z perpendicular to the x–y plane of the elements, as shown by the coordinate system in the figure. The remote transmit antenna emits dual polarized waves, that is, waves of two orthogonal polarizations, which could be unequal in amplitude and phase. These two orthogonal field components of the incident beam can be resolved into components aligned along each of the two directions x and y, respectively, of the power reception and conversion system 1.

These field components are incident on a frequency selective surface ($FSS_1$) 5, located at a first plane. Such surfaces are known in the art and perform the electromagnetic wave equivalent of circuit filter elements. Further discussion on such surfaces is found in Applied Optics, Vol. 14, No. 2, pp. 217–220, "Equivalent-circuit formulas for metal grid reflectors at a dielectric boundary" by Whitburn et al. Therefore, they perform low pass, high pass, bandpass, etc., spatial filtering functions, depending upon their specific design. The frequency selective surface 5 shown in FIG. 1 is a bandpass filter capable of transmitting only frequencies over a narrow band including the powering frequency $f_p$. In this embodiment, the surface is a metalized or metal meshed plate or the like, with an array of openings 7 whose sizes and locations are mainly determined by the frequency and the antenna units used.

Ideally, only the powering frequency is passed with no attenuation, but in practice, the design of the filter is chosen to optimize its electrical characteristics of attenuation inside and outside the passband bandwidth, for each specific application. Typically, frequency selective surfaces attenuate ~30 dB in the stopband and less than 0.5 dB in the passband.

The filtered incident powering beam then travels a distance q to the antenna array 9 located in two second planes 10 and 12 (foreplane 1 and foreplane 2 respectively) where the usual rectenna functions of power reception and conversion take place. This antenna array, for example, can be of the type described in the aforementioned applicant's copending application, Ser. No. 557,680, filed on 16 Sep. 1988. In this embodiment, the rectenna arrays are provided in two parallel second planes one for either of the two polarizations separated from one another by a predetermined optimum distance, e.g. $n\lambda_o/2$. It is, of course, possible to provide a dual polarization array antenna in only one second plane.

The unreceived portion of the powering beam travels to the second frequency selective surface ($FSS_2$) 11. This surface is a bandstop spatial filter, reflecting only frequencies around $f_p$ and is located in a third plane at a distance p behind the nearest second plane. This surface reflects the powering beam and other signals of the same frequency in the correct phase back to the rectenna to improve its reception efficiency in an analogous fashion to the normal rectenna reflector plane. Also compensation for the effect of rectenna transmission lines is achieved by a specific choice of dimension p. The bandstop filter shown in the figure is the complementary structure of the mesh or metalized bandpass filter also shown in the figure. It is made of square disks 13 of metal arranged in an array and supported by a thin transparent film. For the powering beam of 2.45 GHz in the ISM band, typical dimensions a and g shown in FIG. 1 are a=0.6 cm and g=12 cm.

A layer 14 of lossy material is located behind the third plane. Although for clarity only one surface is shown for each filter, several surfaces may be used for each filter function so as to provide the equivalent to multi-section circuit filters and thereby to improve the filter's performance, by decreasing the level of power transmission or reflection of wavefields on frequencies outside the passbands or stopbands.

Figure 2A:
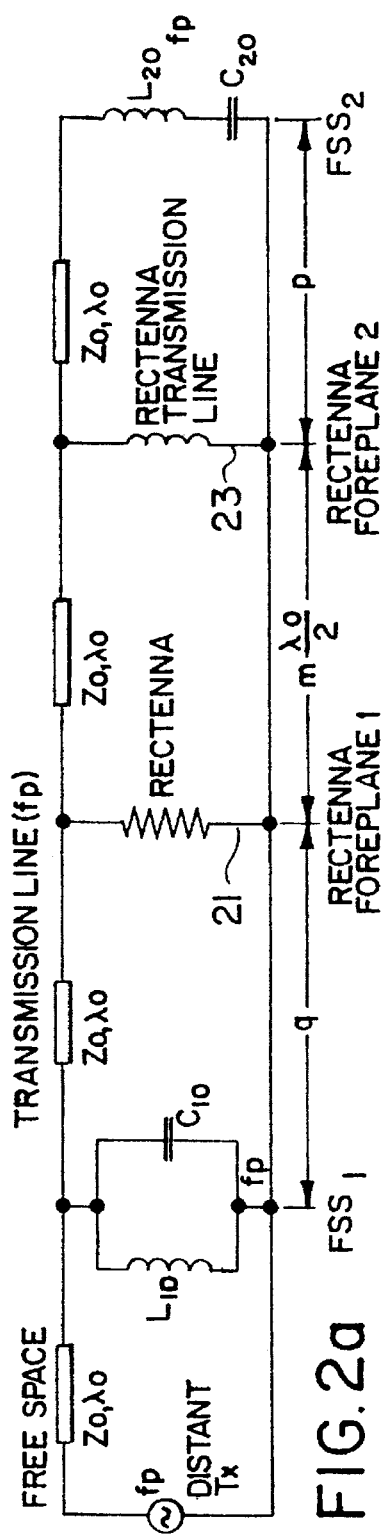
FIG. 2a is a schematic transmission line network model representing the power transmission and reception process for one polarization of the power beam.

FIG. 2a shows the equivalent circuit of the system in the manner described in "Far-Infrared Properties of Metallic Mesh and its Complementary Structure" by Ulrich, Infrared Physics, Vol. 7, pp. 37–55, Pergamon Press Ltd., 1967.

The two second planes are designated by 21 and 23. Free space impedance and wavelength are $Z_o$ and $\lambda_o$. The frequency selective surfaces on the first and third planes are shown by $FSS_1$ and $FSS_2$, each consisting of $L_{10}$ and $C_{10}$ and $L_{20}$ and $C_{20}$, respectively. The equivalent circuit parameters for these filters are determined by the dimensions of the openings and disks and the design bandpass or bandstop frequency. These parameters in turn determine the in-band and out-of-band characteristics of the filters.

The behaviour of the present invention at the powering frequency $f_p$ will become clear upon examination of a network model for one polarization of the incident beam of FIG. 1, as it passes through the system. This model is shown in FIG. 2a. This transmission line equivalent circuit is based upon the unit cell concept used for the quantitative analysis of large arrays and associated elements. When the frequency selective surfaces are designed with the same symmetry and periodicity properties as the antenna units, the unit cell concept may be used for understanding the behaviour of the ensemble of elements. From this network model it is evident that, for the powering frequency $f_p$, no losses occur at either the first or second frequency selective surface and that high efficiency of reception of the powering beam by the rectenna units is possible. This is ensured by the choice of circuit elements $L_{10}$, $C_{10}$ of $FSS_1$ and $L_{20}$, $C_{20}$ of $FSS_2$ at the powering frequency such that $$f_p^2 = \frac{1}{L_{10}C_{10}} \quad (1)$$

and $$f_p^2 = \frac{1}{L_{20}C_{20}} \quad (2)$$

The above explanation has considered the case of a powering beam normally incident upon the system, however, this high efficiency of power reception is possible at any specified angle of incidence, upon modification of the transmission line (unit cell) parameters $Z_o$, $\lambda_o$ in FIG. 2a. Furthermore, these frequency selective surfaces can be made relatively insensitive to deviations from the designed angle of beam incidence, and may thus be used in cases where the range of beam incidence angles cannot be carefully limited. For more detailed description of this aspect, reference can be made to an article entitled "Equivalent-circuit models for frequency-selective surfaces at oblique angles of incidence" by Lee et al, IEE Proceedings, Vol. 132, Pt.H, No. 6, pp. 395–399, Oct. 1985.

Figure 2B:
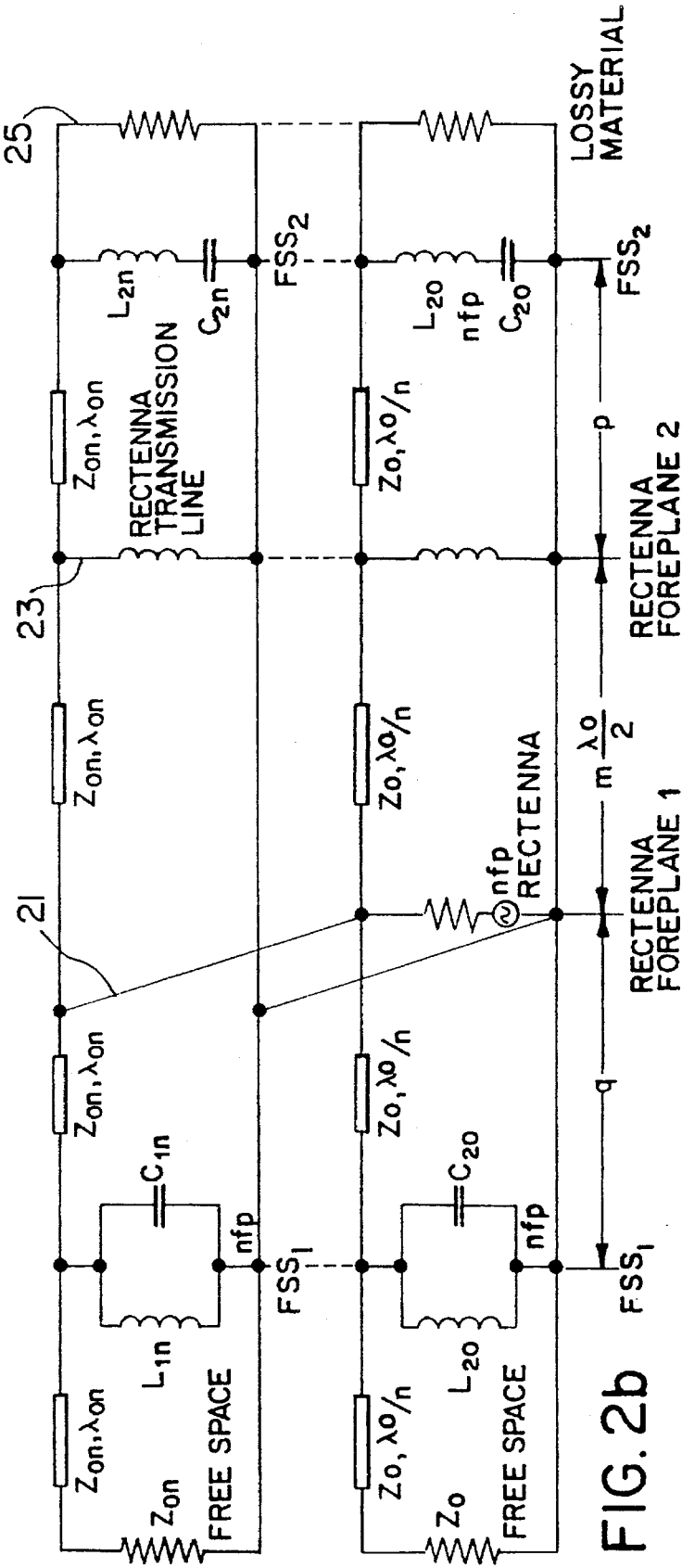
FIG. 2b is a schematic transmission line network model representing the generation and control of harmonic frequency radiation for one polarization of the rectenna unit.

From the above discussion, by referring to FIG. 2b, the behaviour of the system it harmonic frequencies $nf_p$ may be readily visualized, with the assistance of a network model for the system at the harmonic frequency of interest. It is to be noted that for both harmonic and higher frequency intermodulation product generation, the frequency of these generated signals will cause more than one transmission line mode to be of significance. Each of these modes corresponds to radiation (of harmonics or intermodulation products) in a specific direction in space. This condition is represented by paralleled transmission lines in FIGS. 2b and 2c in which two such modes are illustrated. In these figures, like designations are used for like elements and parameters. An optional layer 25 of a lossy material is also included.

Signals on harmonic frequencies and other frequencies out of the system passband, generated at the rectenna diodes, are prevented from radiating into free space by frequency selective surface $FSS_1$. Instead, they are reflected by $FSS_1$ back towards the rectenna and then propagate through $FSS_2$ after which they are absorbed by the lossy material behind this filter. In certain applications of this invention (for example the powering of an aircraft from the ground, if there are no sensitive electronic components on the aircraft or nearby which could be affected adversely by these harmonic and other signals), the lossy material above $FSS_2$ may not be necessary, and construction materials could be chosen to allow harmonic and other signals to propagate into the upper atmosphere and space (above the aircraft).

From the preceding descriptions, the behaviour of the system for spurious signals at intermodulation product frequencies $\pm kf_p \pm lf_c$ may be understood using the network model of FIG. 2c.

In the case where the frequency of the ambient signal, $f_c$, is outside the passband of $FSS_1$ (centered on $f_p$, no intermodulation products will be generated. In the case where $f_c$ is within the passband of $FSS_1$, intermodulation products will be generated, but unless the frequencies of these products fall within the $f_p$ passband, they will be prevented from radiating into space and will be absorbed in the layer behind $FSS_2$.

The above described invention will reduce the level of all radiated harmonics and intermodulation products (outside the passband of the invention). Further attenuation of one harmonic or intermodulation product is possible by the correct choice of distance q, between $FSS_1$ and rectenna foreplane 1. For example, minimization of the second harmonic (often a desirable objective) in the broadside direction (the lower transmission line mode of FIG. 2b) will occur for the 'shorted' (at $2f_p$) bandpass filter when placed approximately $\lambda_o/4$ from the rectenna foreplane 1, effectively 'shorting' the rectenna source at the second harmonic.

We claim:

1. A low noise dual polarization electromagnetic power reception and conversion system comprising:

a plurality of frequency bandpass filter elements arranged symmetrically in an array in a first plane for spatial bandpass filtering and passing signals which include an incident electromagnetic powering beam and incident ambient signals in a passband of the filter elements and for blocking signals at wavelengths outside the passband of the filter elements, a plurality of antenna units, each having power conversion circuitry, arranged symmetrically in an array in at least one second plane behind said first plane for receiving in dual polarization and converting said powering beam to direct current wherein harmonics and intermodulation product signals outside said passband resulting from non-linear mixing and power conversion are produced, a plurality of frequency bandstop elements arranged symmetrically in an array in a third plane behind said at least one second plane for reflecting substantially only frequencies ground and encompassing said electromagnetic powering beam, and a layer of lossy material located behind entire third plane for absorbing substantially any electromagnetic wave power incident thereupon, whereby said electromagnetic powering beam within said passband is reflected by said bandstop elements and said harmonic and intermodulation signals outside said passband is absorbed by said lossy material.

2. The low noise dual polarization electromagnetic power reception and conversion system, according to claim 1, wherein:

said antenna units are substantially identical polarization units.

3. The low noise dual polarization electromagnetic power reception and conversion system, according to claim 1, wherein:

said antenna units are arranged in two parallel but spaced apart second planes and are polarized in either of two orthogonal directions.

4. The low noise dual polarization electromagnetic power reception and conversion system, according to claim 2, wherein:

said first, at least one second and third planes are parallel to but separated from each other by predetermined distances.

5. The low noise dual polarization electromagnetic power reception and conversion system, according to claim 3, wherein:

the said first, at least one second and third planes are parallel to but separated from each other by predetermined distances.

* * * * *